US010325415B2

(12) United States Patent
Fan et al.

(10) Patent No.: US 10,325,415 B2
(45) Date of Patent: Jun. 18, 2019

(54) VIRTUAL MODEL DISPLAY METHOD, DEVICE AND SYSTEM

(71) Applicant: TENCENT TECHNOLOGY (SHENZHEN) COMPANY LIMITED, Shenzhen (CN)

(72) Inventors: Chuankang Fan, Shenzhen (CN); Zhe Zhu, Shenzhen (CN); Ming Zhao, Shenzhen (CN); Yanqing Jing, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/052,690

(22) Filed: Aug. 2, 2018

(65) Prior Publication Data
US 2018/0342111 A1 Nov. 29, 2018

Related U.S. Application Data

(63) Continuation of application No. PCT/CN2017/082357, filed on Apr. 28, 2017.

(30) Foreign Application Priority Data

Apr. 29, 2016 (CN) .......................... 2016 1 0284133

(51) Int. Cl.
*H04W 4/80* (2018.01)
*A63F 13/65* (2014.01)
(Continued)

(52) U.S. Cl.
CPC .............. *G06T 19/20* (2013.01); *A63F 13/65* (2014.09); *G06F 3/04847* (2013.01);
(Continued)

(58) Field of Classification Search
None
See application file for complete search history.

(56) References Cited

U.S. PATENT DOCUMENTS

| 2002/0196250 A1 | 12/2002 | Anderson et al. | |
| 2015/0258435 A1 | 9/2015 | Zhang et al. | |
| 2016/0033251 A1* | 2/2016 | Pinkston | G01B 21/00 |
| | | | 702/81 |

FOREIGN PATENT DOCUMENTS

| CN | 102043890 A | 5/2011 |
| CN | 102819629 A | 12/2012 |

(Continued)

OTHER PUBLICATIONS

The World Intellectual Property Organization (WIPO) International Search Report for PCT/CN2017/082357 dated Aug. 3, 2017 8 Pages (including translation).

(Continued)

*Primary Examiner* — Frank S Chen
(74) *Attorney, Agent, or Firm* — Anova Law Group, PLLC

(57) ABSTRACT

A virtual model display method, device and system are provided. The method includes: receiving a first identification information list sent by an entity equipment; sending the first identification information list to a server. The first identification information list is used for triggering the server to determine a second identification information list according to the first identification information list. The method also includes receiving the second identification information list fed back by the server. The second identification information list includes identification information in the first identification information list and verified by the server. The method also includes acquiring one or more virtual images corresponding to the identification information in the second identification information list; and assem- (Continued)

bling the one or more virtual images to obtain a virtual model corresponding to the entity equipment.

20 Claims, 10 Drawing Sheets

(51) Int. Cl.
    *G06T 15/20*     (2011.01)
    *G06T 19/20*     (2011.01)
    *H04L 29/08*     (2006.01)
    *H04M 1/725*     (2006.01)
    *G06F 3/0484*     (2013.01)

(52) U.S. Cl.
    CPC ......... *G06T 15/20* (2013.01); *H04M 1/72522* (2013.01); *G06T 2200/24* (2013.01); *G06T 2219/2004* (2013.01); *G06T 2219/2008* (2013.01); *H04L 67/12* (2013.01); *H04M 1/7253* (2013.01); *H04W 4/80* (2018.02)

(56) References Cited

FOREIGN PATENT DOCUMENTS

| | | |
|---|---|---|
| CN | 102819756 A | 12/2012 |
| CN | 103488275 A | 1/2014 |
| CN | 103764236 A | 4/2014 |
| CN | 104007703 A | 8/2014 |
| CN | 104363969 A | 2/2015 |
| CN | 104636518 A | 5/2015 |
| CN | 105006023 A | 10/2015 |
| CN | 105978959 A | 9/2016 |

OTHER PUBLICATIONS

David Anderson et al. "Building Virtual Structures With Physical Blocks" Proceedings of the 12th Annual ACM Symposium on User Interface Software and Technology, Ashville, NC, USA, Nov. 10, 1999 (Nov. 10, 1999), p. 1, left column, line 11 to p. 2, right column, line 12.

David Anderson et al. "Tangible Interaction + Graphical Interpretation: A New Approach to 3D Modeling" Computer Graphics SIGGRAPH 2000 Conference Proceedings. New Orleans, LA, Jul. 28, 2000 (Jul. 28, 2000), p. 1, left column, line 2 to p. 14, line 30.

Matthew G. Gorbet et al. "Triangles: Tangible Interface for Manipulation and Exploration of Digital Information Topography" Human Factors in Computing Systems. Conference Proceedings. Los Angeles, CA, Apr. 23, 1998 (Apr. 23, 1998), p. 1, left column, line 1 to p. 8, right column, line 15.

The State Intellectual Property Office of the People's Republic of China (SIPO) Office Action 1 for 201610284133.5 dated Jul. 26, 2018 13 Pages (including translation).

\* cited by examiner

VIRTUAL MODEL DISPLAY METHOD, DEVICE AND SYSTEM

CROSS REFERENCES TO RELATED APPLICATIONS

This application is a continuation application of PCT Patent Application No. PCT/CN2017/082357, filed on Apr. 28, 2017, which claims priority to Chinese Patent Application No. 201610284133.5, entitled "VIRTUAL MODEL DISPLAY METHOD, DEVICE AND SYSTEM" filed on Apr. 29, 2016, the entire contents of all of which are incorporated herein by reference.

FIELD OF THE TECHNOLOGY

The present disclosure relates to the field of computer technology, and particularly, relates to a virtual model display method, device and system.

BACKGROUND OF THE DISCLOSURE

Assembled entity equipment, which may be assembled into various shapes according to users' ideas, is thus loved by the majority of users.

For example, a user may assemble a variety of functional components onto an inherent component, and may also replace the assembled functional components. However, some functional components need to cooperate with the inherent component to realize corresponding functions, but the user's free assembly may result in that partial functional components are assembled to the mismatched inherent component, so that these functional components cannot realize the corresponding functions, or these functional components are damaged.

SUMMARY

An embodiment of the present disclosure provides a virtual model display method, applied to an intelligent terminal. The method includes: receiving, by the intelligent terminal, a first identification information list sent by an entity equipment. The first identification information list includes first identification information of components of the entity equipment acquired by the entity equipment. The first identification information includes at least an identification information of an inherent component of the entity equipment and an identification information of a functional component of the entity equipment. The functional component is a detachable component installed on the inherent component of the entity equipment. The method further includes: sending, by the intelligent terminal, the first identification information list to a server. The first identification information list is used for triggering the server to determine a second identification information list according to the first identification information list. The method also includes receiving, by the intelligent terminal, the second identification information list fed back by the server. The second identification information list includes identification information that is included in the first identification information list and verified by the server. The method also includes acquiring, by the intelligent terminal, one or more virtual images corresponding to the identification information in the second identification information list; and assembling the one or more virtual images to obtain a virtual model corresponding to the entity equipment.

An embodiment of the present disclosure provides a virtual model display device, applied to an intelligent terminal. The device includes: a memory, and a processor coupled to the memory. The processor is configured to perform: receiving a first identification information list sent by an entity equipment. The first identification information list includes first identification information of components of the entity equipment acquired by the entity equipment. The first identification information includes at least an identification information of an inherent component of the entity equipment and an identification information of a functional component of the entity equipment. The functional component is a detachable component installed on the inherent component of the entity equipment. The processor is further configured to perform: sending the first identification information list to a server. The first identification information list IS used for triggering the server to determine a second identification information list according to the first identification information list. The processor is further configured to perform: receiving the second identification information list fed back by the server. The second identification information list includes identification information that is included in the first identification information list and verified by the server. The processor is further configured to perform: acquiring one or more virtual images corresponding to the identification information in the second identification information list; and assembling the one or more virtual images to obtain a virtual model corresponding to the entity equipment.

An embodiment of the present disclosure provides a non-transitory computer-readable medium storing computer-executable program. When being executed by a processor of an intelligent terminal, the computer-executable program causes the processor to perform: receiving a first identification information list sent by an entity equipment. The first identification information list includes first identification information of components of the entity equipment acquired by the entity equipment. The first identification information includes at least an identification information of an inherent component of the entity equipment and an identification information of a functional component of the entity equipment. The functional component is a detachable component installed on the inherent component of the entity equipment. The computer-executable program further causes the processor to perform: sending the first identification information list to a server. The first identification information list is used for triggering the server to determine a second identification information list according to the first identification information list. The computer-executable program further causes the processor to perform: receiving the second identification information list fed back by the server. The second identification information list includes identification information that is included in the first identification information list and verified by the server. The computer-executable program further causes the processor to perform: acquiring one or more virtual images corresponding to the identification information in the second identification information list; and assembling the one or more virtual images to obtain a virtual model corresponding to the entity equipment.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

To make the objectives, technical solutions and advantages of the present disclosure clearer, the following further describes the embodiments of the present disclosure in detail with reference to the accompanying drawings.

Figure 1:
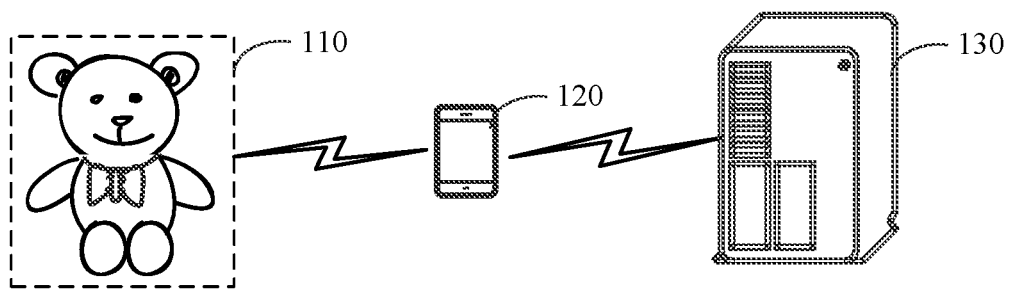
FIG. 1 is a schematic diagram of an implementation environment involved in virtual model display methods according to partial embodiments of the present disclosure.

FIG. 1 is a schematic diagram of an implementation environment involved in virtual model display methods according to partial embodiments of the present disclosure. As shown in FIG. 1, the implementation environment may include entity equipment 110, an intelligent terminal 120 and a server 130.

The entity equipment 110 and the intelligent terminal 120 may be connected in a wireless network mode or a wired network mode. The intelligent terminal 120 and the server 130 may be connected in a wireless network mode or a wired network mode. The wireless network mode herein may be of a mobile data network or wireless fidelity (Wi-Fi), or a wireless network mode of Bluetooth or the like. In one embodiment, a main chip of the entity equipment 110 may communicate with the intelligent terminal 120 using Bluetooth connection; and the intelligent terminal 120 may communicate with the server 130 using internet connection.

The entity equipment 110 may be a detachable entity, and the entity equipment 110 includes at least one detachable entity component. Each entity component has respective identification information.

Information interaction may be performed between the intelligent terminal 120 and the server 130.

The server 130 herein may be a server, or a server cluster consisting of a plurality of servers, or a cloud computing service center.

In actual application, a user may assemble various functional components onto an inherent component. However, some functional components need to cooperate with the inherent component to realize corresponding functions, but the user's free assembly may result in that partial functional components are assembled to the mismatched inherent component, so that these functional components cannot realize the corresponding functions. To remind the user of timely replacing the functional components mismatched with the inherent component when the user assembles the functional components onto the mismatched inherent component, the following describes a virtual model display method with reference to FIG. 2A and FIG. 3A.

Figure 2A:
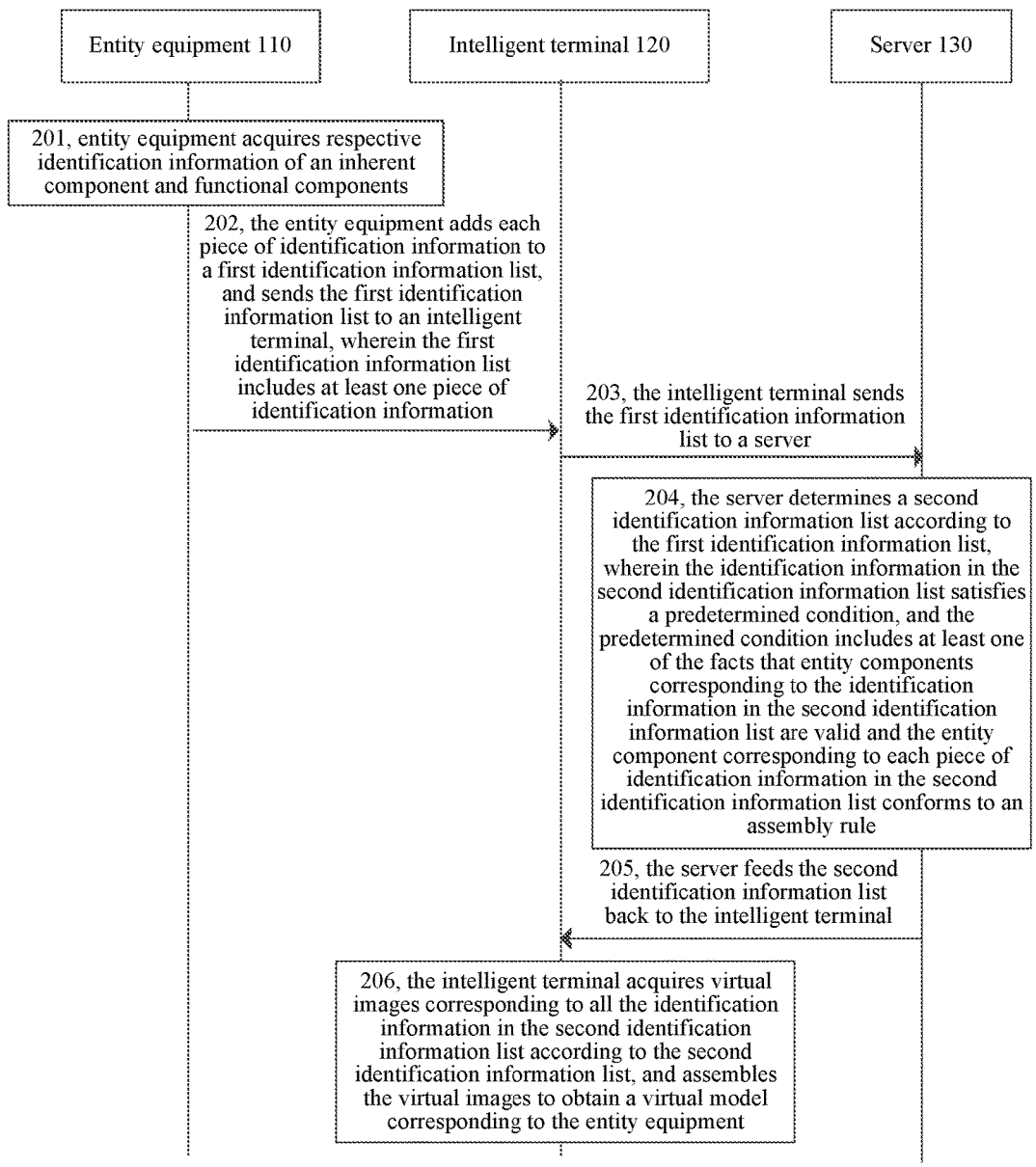
FIG. 2A is a flow diagram of a virtual model display method according to an embodiment of the present disclosure.

FIG. 2A is a flow diagram of a virtual model display method according to an embodiment of the present disclosure. As shown in FIG. 2A, when being applied to the implementation environment of FIG. 1, the virtual model display method includes the following steps.

Step 201, entity equipment acquires respective identification information of an inherent component and functional components.

Figure 2B:
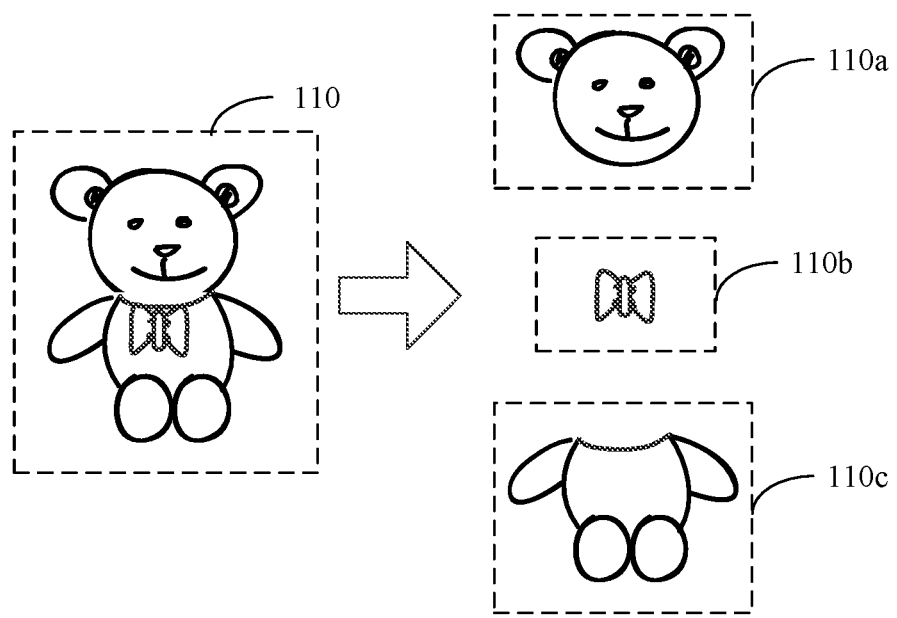
FIG. 2B is a schematic diagram of entity equipment according to an embodiment of the present disclosure.

The entity equipment described herein includes the inherent component and at least one functional component installed on the inherent component. FIG. 2B is a schematic diagram of entity equipment according to an embodiment of the present disclosure. As shown in FIG. 2B, the entity equipment 110 may be composed of an inherent component 110a, a functional component 110b and a functional component 110c.

The inherent component and the functional components are collectively referred to as entity components. All the entity components on a piece of independent entity equipment may be assembled by connecting structures, and the connecting structures may be mutually matched threaded structures, metal contacts, magnets and the like. For example, when a metal touch spot is arranged at the junction of an upper entity component of the entity equipment and a lower entity component of the entity equipment, a user can splice and assemble the upper entity component of the entity equipment and the lower entity component of the entity equipment via the metal touch spot to form the complete entity equipment.

After the functional components and the inherent component are assembled, chips in the functional components are connected with a main chip in the inherent component via a bus. The entity equipment may acquire identification information, stored in the main chip, of the inherent component, and polls the chips of all the functional components connected to the bus by using the main chip, to acquire the identification information, stored in the chip of the functional component, of each functional component.

In actual application, the entity equipment may be an entity toy, and also may be an entity model, or the like. The entity model may be a structure model of a building, a structure model of a traffic road condition, or the like. In one example, the entity equipment is an electronic toy car. The inherent component can be unchangeable car model component which is integrated in a main control board of the toy car and/or bound on a main body of the toy car. The functional component can be detachable/changeable weapon component (e.g., main weapon, auxiliary weapon) and/or effect improvement component (e.g., shield, light, propeller). Different car model components may have different designs and different initial parameters (e.g., speed, fire power, armor, endurance). By attaching/detaching the functional components to a car model component, parameters of the toy car may be modified (e.g., increasing a fire power when a weapon component is attached, decreasing a speed when a propeller is detached, extending operation time when a fuel/battery component is attached). In some embodiments, attaching/detaching a functional component may modify a physical parameter of the entity equipment (e.g., extended endurance when attaching a battery component, added transformation capability when attaching a corresponding transformable functional component) and/or a virtual parameter of the entity equipment (e.g., increased fire power when attaching an auxiliary weapon component). In some embodiments, the effect of the virtual parameter may be presented by physical feature of the entity component (e.g., embedding a light and/or a speaker in the toy car and using different lighting effects or different sounds to indicate effects of different weapons, the light and the speaker being embedded in either the inherent component or the functional component).

Step 202, the entity equipment adds each piece of identification information to a first identification information list, and sends the first identification information list to an intelligent terminal, wherein the first identification information list includes at least one piece of identification information. In other words, the intelligent terminal receives the first identification information list from the entity equipment. The first identification information list includes first identification information of components of the entity equipment acquired by the entity equipment, the first identification information including at least an identification information of an inherent component of the entity equipment and an identification information of a functional component of the entity equipment, and the functional component is a detachable component installed on the inherent component of the entity equipment.

In order to ensure legality of an entity component and prevent piracy of the entity component, the identification information of the entity component leaving a factory is encrypted according to a predetermined encryption mode. When the entity equipment acquires the identification information of each entity component, the entity equipment needs to decrypt the acquired identification information according to a decryption mode corresponding to the encryption mode. Then, the identification information decrypted successfully may be added to the first identification information list, so as to be uniformly sent to the intelligent terminal.

Because the identification information obtained by encrypting according to the predetermined encryption mode may be decrypted according to the decryption mode corresponding to the predetermined encryption mode, if the identification information cannot be decrypted successfully by the entity equipment, it indicates that the encryption mode of the identification information is not consistent with the decryption mode of the entity equipment, thus determining that the identification information may be mismatched with the entity equipment, or the identification information may be invalid. Thus, before adding each piece of identification information to the first identification information list, the entity equipment removes the identification information that cannot be decrypted in advance, and adds the identification information that can be decrypted to the first identification information list, so that all the identification information in the first identification information list is the identification information that can be decrypted, and the validity of the identification information in the first identification information list is improved.

Correspondingly, the intelligent terminal receives the first identification information list sent by the entity equipment.

Step 203, the intelligent terminal sends the first identification information list to a server.

Even if the identification information in the first identification information list is decrypted successfully, an illegal manufacturer may encrypt the identification information according to a stolen encryption mode after stealing the encryption mode, and the intelligent terminal cannot inquire latest parameters and an assembly rule of the entity components corresponding to the identification information in the first identification information list, so the intelligent terminal needs to send the first identification information list to the server.

Correspondingly, the server receives the first identification information list generated by the entity equipment and forwarded by the intelligent terminal.

Step 204, the server determines a second identification information list according to the first identification information list, wherein the identification information in the second identification information list satisfies a predetermined condition, and the predetermined condition includes at least one of the facts that the entity components corresponding to the identification information in the second identification information list are valid and the entity component corresponding to each piece of identification information in the second identification information list conforms to an assembly rule. In other words, the second identification information list comprises identification information that is included in the first identification information list and verified by the server. Further, the identification information in the second identification information list is verified by the server as satisfying a predetermined condition. The predetermined condition comprising at least one of: a component corresponding to an identification information in the second identification information list is valid, and components corresponding to each piece of identification information in the second identification information list conform to an assembly rule.

After receiving the first identification information list sent by the intelligent terminal, the server may add the identification information satisfying the predetermined condition in the first identification information list to the second identification information list. The predetermined condition herein includes at least one of the facts that the entity components corresponding to the identification information in the second identification information list are valid and the entity component corresponding to each piece of identification information in the second identification information list conforms to the assembly rule. From the above content of satisfying the predetermined condition, there are at least three situations that the server adds the identification information satisfying the predetermined condition in the first identification information list into the second identification information list:

In the first situation, the server adds valid identification information of the corresponding entity components in the first identification information list to the second identification information list.

The valid identification information herein indicates identification information that can be inquired by the server in the pre-stored identification information in the first identification information list. For example, suppose the first identification information list contains identification information "123" and identification information "456". If the server only finds the identification information "123" in the pre-stored identification information but does not find the identification information "456", the server can determine that the identification information "123" is valid identification information, and adds the identification information "123" to the second identification information list.

In the second situation, the server adds the identification information, conforming to the assembly rule, of the corresponding entity components in the first identification information list to the second identification information list.

The identification information conforming to the assembly rule herein indicates corresponding identification information of the functional components matched with the inherent component.

The assembly rule herein defines the possibility that the functional components are assembled to the same fixed component and can normally operate corresponding functions.

In the third situation, the server adds the identification information, which is valid and conforms to the assembly rule, of the corresponding entity components in the first identification information list to the second identification information list.

Step 205, the server feeds the second identification information list back to the intelligent terminal.

In order to prevent an illegal manufacturer from encrypting the identification information according to a stolen encryption mode after stealing the encryption mode, resulting in that the intelligent terminal cannot inquire latest parameters and the assembly rule of the entity components corresponding to the identification information in the first identification information list, the server feeds the second identification information list containing the identification information satisfying the predetermined condition back to the intelligent terminal.

Correspondingly, the intelligent terminal receives the second identification information list fed back by the server.

Step 206, the intelligent terminal acquires virtual images corresponding to all the identification information in the second identification information list according to the second identification information list, and assembles the virtual images to obtain a virtual model corresponding to the entity equipment. In some embodiments, the virtual images are three-dimensional (3D) and the virtual model is presented by the intelligent terminal as a 3D model. The intelligent terminal may provide a user interface that allow the user to view the 3D virtual model in different angles and directions, and to view virtual model corresponding to individual components of the entity equipment based on user selection. The 3D virtual image of an entity component is pre-created to have a substantial same appearance as the corresponding entity component. Further, the assembled 3D virtual model has a substantial same appearance as the entity equipment.

The intelligent terminal receives the second identification information list fed back by the server, and may acquire virtual images corresponding to all the identification information in the second identification information list according to the second identification information list, inquire the type of each piece of identification information in the second identification information list, set the virtual image corresponding to each piece of identification information to a corresponding position of the virtual model corresponding to the entity equipment according to an assembly position corresponding to the identification information, and display the virtual model, obtained after assembling, on a display screen when the virtual images corresponding to all the identification information in the second identification information list are all set on the virtual model. In some embodiments, the server may inform the intelligent terminal that a piece of identification information in the first identification information list does not conform to the assembly rule. Accordingly, the first intelligent terminal may display a reminder that a functional component corresponding to the piece of identification information is mismatched with the inherent component.

To sum up, according to the virtual model display method according to the embodiments of the present disclosure, the respective identification information of the inherent component and the functional components is sent to the intelligent terminal, and the intelligent terminal forwards the identification information to the server, and assembles the virtual images corresponding to all the identification information when receiving the identification information fed back by the server and satisfying the predetermined condition. After the server feeds the identification information satisfying the predetermined condition back to the intelligent terminal, the intelligent terminal only assembles the virtual images corresponding to the identification information satisfying the predetermined condition, thereby solving the problem in relevant technologies that some functional components need to cooperate with the inherent component to realize corresponding functions, but a user's free assembly may result in that partial functional components are assembled to the mismatched inherent component, so that these functional components cannot realize the corresponding functions, or these functional components are damaged, and achieving the effects of only assembling the virtual images corresponding to the identification information satisfying the predetermined condition and reminding the user of timely replacing the functional components corresponding to the identification information not satisfying the predetermined condition.

Figure 3A:
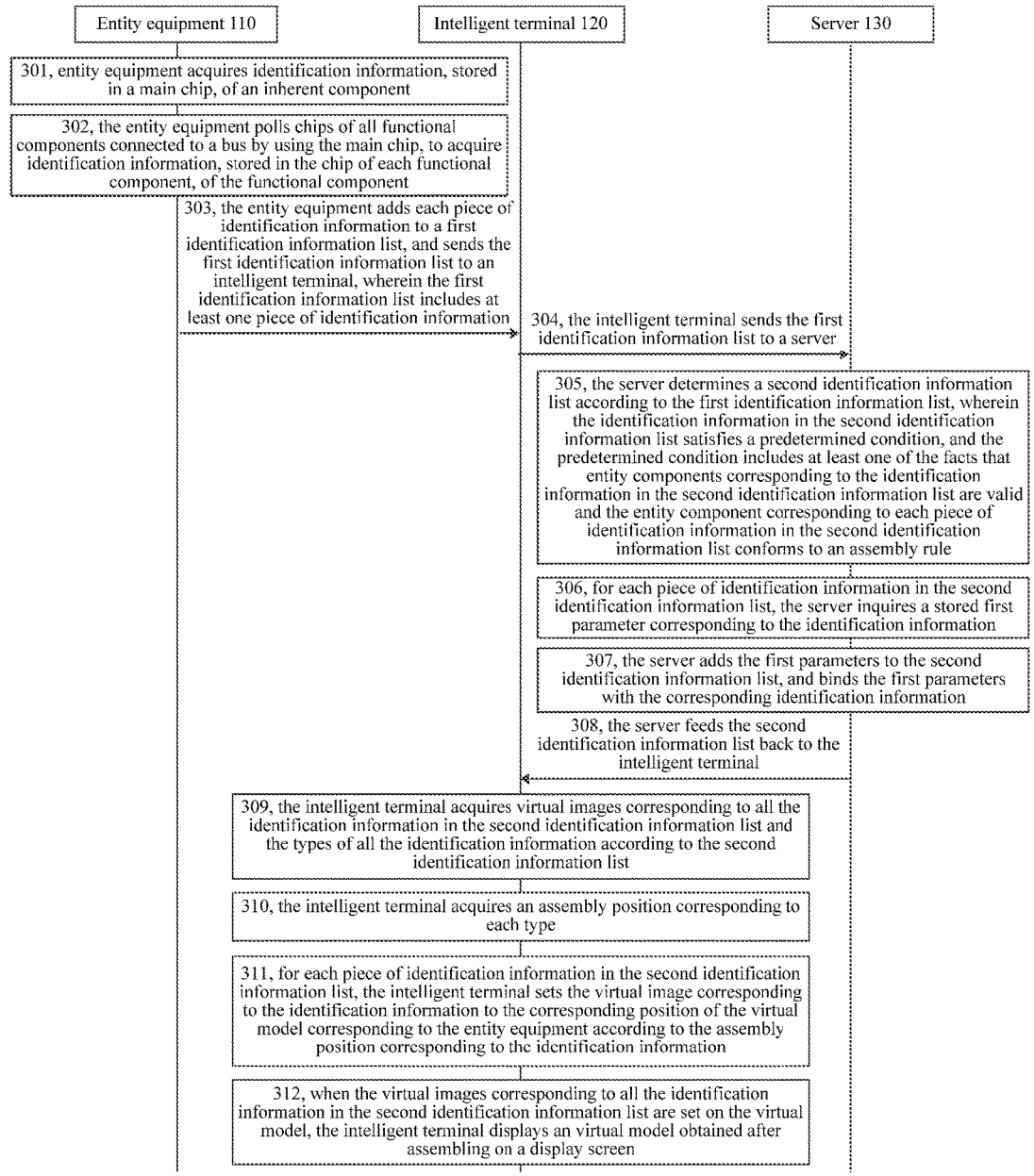
FIG. 3A is a flow diagram of a virtual model display method according to another embodiment of the present disclosure.

FIG. 3A is a flow diagram of a virtual model display method according to another embodiment of the present disclosure. The virtual model display method is applied to the implementation environment of FIG. 1. As shown in FIG. 3A, step 201 in FIG. 2A may be replaced with step 301 to step 302 below, and step 206 in FIG. 2A may be replaced with step 309 to step 312 below.

Step 301, entity equipment acquires identification information, stored in a main chip, of an inherent component.

The identification information herein may uniquely identify an entity component, and also may uniquely identify a type of entity components. The entity components having the same assembly position may be classified as the same type of entity components.

Step 302, the entity equipment polls chips of all functional components connected to a bus by using the main chip, to acquire identification information, stored in the chip of each functional component, of the functional component.

Each entity component includes an electronic chip, and the electronic chip of each entity component includes identification information of the entity component. Herein, the electronic chip of the functional component is referred to as the chip, and the electronic chip in the inherent component is referred to as the main chip.

In addition to the identification information of the entity component, the electronic chip of each entity component may further include a type of the entity component, an assembly position of the entity component, and the like.

In actual application, the bus may be a 1-Wire.

Step 303, the entity equipment adds each piece of identification information to a first identification information list, and sends the first identification information list to an intelligent terminal, wherein the first identification information list includes at least one piece of identification information.

Correspondingly, the intelligent terminal receives the first identification information list sent by the entity equipment.

Step 304, the intelligent terminal sends the first identification information list to a server.

Correspondingly, the server receives the first identification information list generated by the entity equipment and forwarded by the intelligent terminal.

Step 305, the server determines a second identification information list according to the first identification information list, wherein the identification information in the second identification information list satisfies a predetermined condition, and the predetermined condition includes at least one of the facts that the entity components corresponding to the identification information in the second identification information list are valid and the entity component corresponding to each piece of identification information in the second identification information list conforms to an assembly rule.

Step 306, for each piece of identification information in the second identification information list, the server inquires a stored first parameter corresponding to the identification information.

In actual application, the first parameter may be level information of the entity component corresponding to the identification information, description information of the entity component corresponding to the identification information, control information of the entity component corresponding to the identification information, and the like.

For example, when the first parameter is level information of the entity component corresponding to the identification information, if the first parameter is 3, the level of the entity component corresponding to the identification information is 3. When the first parameter is description information of the entity component corresponding to the identification information, if the first parameter is "lower body of a bear, after equipment: defense +10, speed +5", the description information of the entity component corresponding to the identification information is "lower body of a bear, after equipment: defense +10, speed +5". When the first parameter is control information of the entity component corresponding to the identification information, if the first parameter is "red", the control information of the entity component corresponding to the identification information is "red".

Step 307, the server adds the first parameters into the second identification information list, and binds the first parameters with the corresponding identification information. In other words, the second identification information list further includes first parameters corresponding to each piece of the identification information in the second identification information list.

For each piece of identification information in the second identification information list, the server inquires a stored type corresponding to the identification information, adds the type corresponding to the identification information into the second identification information list, and binds the identification information with the type corresponding to the identification information. That is, the second identification information list further includes types of each piece of the identification information in the second identification information list.

Step 308, the server feeds the second identification information list back to the intelligent terminal.

Correspondingly, the intelligent terminal receives the second identification information list fed back by the server.

Step 309, the intelligent terminal acquires virtual images corresponding to all the identification information in the second identification information list and the types of all the identification information according to the second identification information list.

Step 310, the intelligent terminal acquires an assembly position corresponding to each type.

The assembly position herein indicates that a virtual image corresponding to a type of identification information is set at a corresponding position of a virtual model corresponding to the entity equipment.

Step 311, for each piece of identification information in the second identification information list, the intelligent terminal sets the virtual image corresponding to the piece of the identification information to the corresponding position of the virtual model corresponding to the entity equipment according to the assembly position corresponding to the type of the piece of the identification information.

For example, if the assembly position corresponding to the identification information "123" is "a1", the virtual image corresponding to the identification information "123" is set at the position "a1" of the virtual model corresponding to the entity equipment.

Step 312, when the virtual images corresponding to all pieces of the identification information in the second identification information list are set on corresponding assembly locations on the virtual model, the intelligent terminal displays the virtual model, obtained after assembling, on a display screen.

Figure 3B:
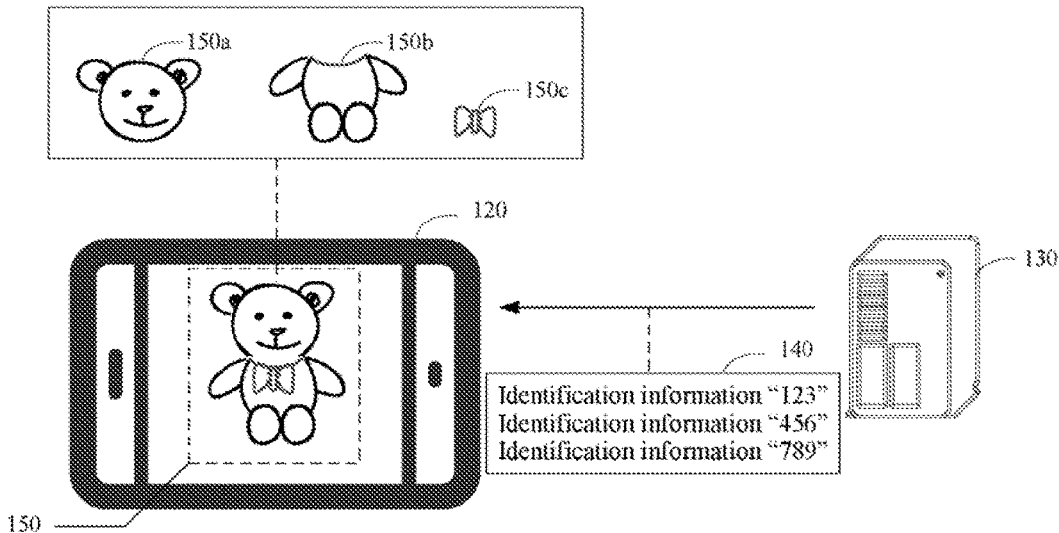
FIG. 3B is a schematic diagram of a virtual model corresponding to entity equipment according to an embodiment of the present disclosure.

FIG. 3B is a schematic diagram of a virtual model corresponding to entity equipment according to an embodiment of the present disclosure. As shown in FIG. 3B, a second identification list 140 received by the intelligent terminal 120 includes three pieces of identification information, which are respectively identification information "123", identification information "456" and identification information "789", wherein an entity component corresponding to the identification information "456" is an inherent component, and entity components corresponding to the identification information "123" and the identification information "789" are functional components. When the intelligent terminal 120 sets a virtual image 150a corresponding to the identification information "123" and a virtual image 150c corresponding to the identification information "789" to a virtual image 150b corresponding to the identification information "456", a virtual model 150, obtained after assembling, is displayed on a display screen.

It should be noted that steps 202 to 204 are similar to steps 303 to 305, and step 205 is similar to step 308, so this embodiment does not further describe step 303 to step 304 and step 306 to step 307.

To sum up, according to the virtual model display method according to the embodiment of the present disclosure, the respective identification information of the inherent component and the functional components is sent to the intelligent terminal, and the intelligent terminal forwards the identification information to the server, and assembles the virtual images corresponding to all the identification information when receiving the identification information fed back by the server and satisfying the predetermined condition. After the server feeds the identification information satisfying the predetermined condition back to the intelligent terminal, the intelligent terminal only assembles the virtual images corresponding to all the identification information satisfying the predetermined condition, thereby solving the problem in relevant technologies that some functional components need to cooperate with the inherent component to realize corresponding functions, but a user's free assembly may result in that partial functional components are assembled to the mismatched inherent component, so that these functional components cannot realize the corresponding functions, or these functional components are damaged, and achieving the effects of only combining the virtual images corresponding to all the identification information satisfying the predetermined condition and reminding the user of timely replacing the functional components corresponding to the identification information not satisfying the predetermined condition.

In some embodiments, the virtual images corresponding to the identification information are set at the corresponding positions of the virtual model corresponding to the entity equipment according to the assembly positions corresponding to the types of the identification information, to achieve the effect of precisely assembling the virtual images corresponding to the identification information after acquiring the types of the identification information.

Figure 4A:
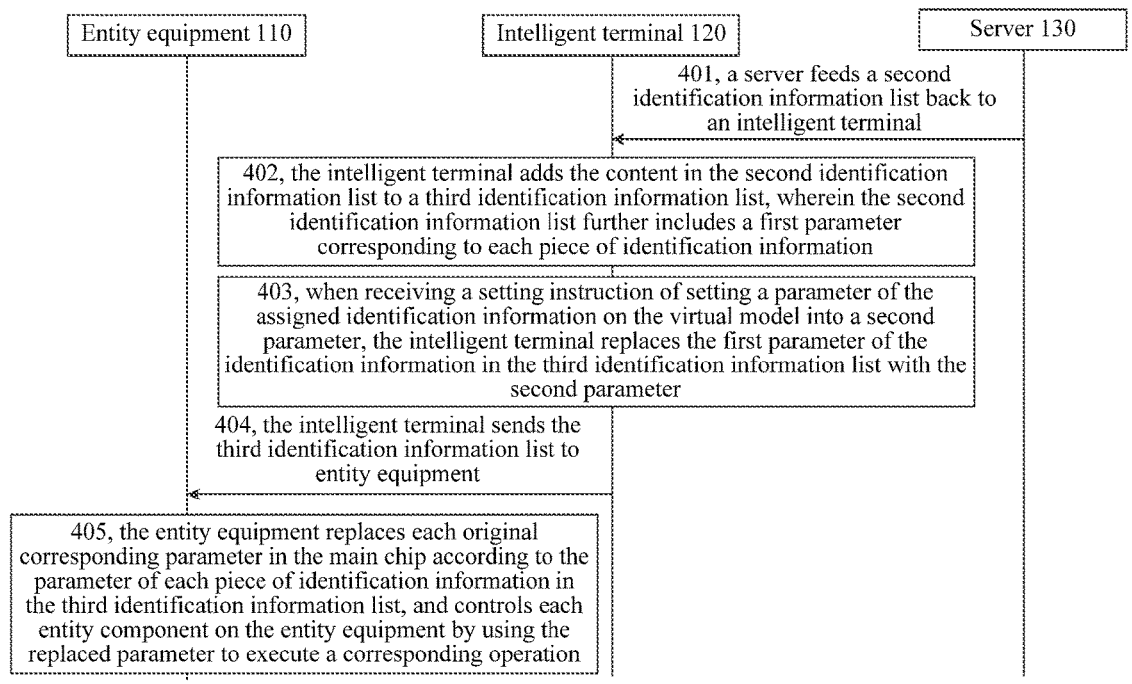
FIG. 4A is a flow diagram of a method of controlling each entity component on entity equipment to execute a corresponding operation according to an embodiment of the present disclosure.

In a first possible implementation manner, when the second identification information list further includes a first parameter corresponding to each piece of identification information and the first parameter is control information of the identification information, the intelligent terminal may add a content in the second identification information list into a third identification information list, and sends the third identification information list to the entity equipment, so that the entity equipment controls each entity component on the entity equipment to execute a corresponding operation according to a parameter of each piece of identification information in the third identification information list. FIG. 4A is a flow diagram of a method of controlling each entity component on entity equipment to execute a corresponding operation according to an embodiment of the present disclosure. As shown in FIG. 4A, when being applied to the implementation environment of FIG. 1, the virtual model display method includes the following steps.

Step 401, a server feeds a second identification information list back to an intelligent terminal.

Correspondingly, the intelligent terminal receives the second identification information list fed back by the server.

Step 402, the intelligent terminal adds a content in the second identification information list into a third identification information list, wherein the second identification information list further includes a first parameter corresponding to each piece of identification information.

Step 403, when receiving a setting instruction of setting a parameter of an specified identification information on a virtual model into a second parameter, the intelligent terminal replaces the first parameter of the identification information in the third identification information list with the second parameter. In some embodiments, the setting instruction is generated based on a user input directed to a specified component of the virtual model displayed on the intelligent terminal. The intelligent terminal may provide a graphical user interface (UI) for setting parameters of components of the virtual model, which is applied to physical components of the entity equipment. For example, when a virtual image corresponding to a component is selected on the virtual model, the UI may display current parameter value of the component and available parameter setting options associated with the selected component. Some parameter setting options may be available only when a user account satisfies certain condition (e.g., usage frequency of the component by the user reaches a preset level, a previous battle result indicates a qualifying user status, a payment made on the intelligent terminal is processed by the server for an upgrade of the parameter value).

For example, suppose that the first parameter of the identification information in the third identification information list is "2", when receiving a setting instruction of setting the parameter of the identification information into a second parameter "3", the intelligent terminal replaces the first parameter "2" of the identification information in the third identification information list with the second parameter "3".

Step 404, the intelligent terminal sends the third identification information list to entity equipment.

The third identification information list herein includes identification information and parameters corresponding to the identification information, wherein each parameter includes at least one of a first parameter inquired by the server and corresponding to the identification information and a second parameter after the intelligent terminal replaces the first parameter.

Correspondingly, the entity equipment receives the third identification information list sent by the intelligent terminal.

Step 405, the entity equipment replaces each original corresponding parameter in a main chip with the parameter of each piece of identification information in the third identification information list, and controls each entity component on the entity equipment by using the replaced parameters to execute a corresponding operation.

Figure 4B:
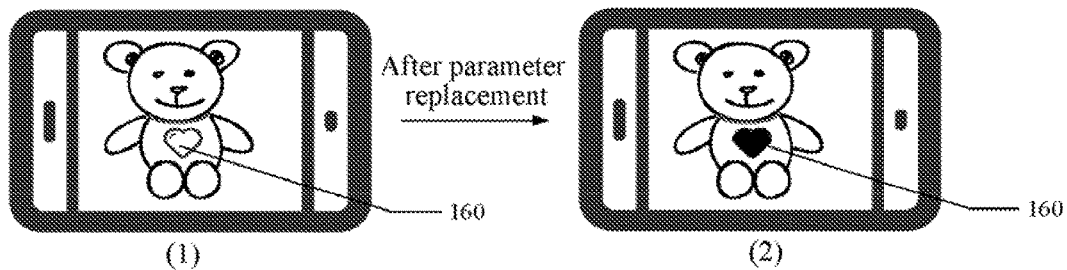
FIG. 4B is a schematic diagram of a virtual model corresponding to entity equipment according to an embodiment of the present disclosure.

FIG. 4B is a schematic diagram of a virtual model corresponding to entity equipment according to an embodiment of the present disclosure. As shown in FIG. 4B, suppose that a parameter of identification information "123" in an inherent component of the entity equipment is "none", at the moment, a functional component 160 corresponding to the identification information "123" does not emit light of any color (as shown in FIG. 4B (1)). After the entity equipment receives a third identification information list sent by an intelligent terminal, the entity equipment replaces the parameter "none" of the identification information "123" in the entity equipment with a parameter "red" of the identification information "123" in the third identification information list, and controls the functional component 160 corresponding to the identification information "123" in the entity equipment by using the replaced parameter "red" of the identification information "123" to emit red light (expressed by black in FIG. 4B (2)).

It should be noted that the entity equipment may control the functional component corresponding to the identification information by using the parameter of the identification information to change shape, change color, change size, change performance, and the like.

In some embodiments, according to the parameter of each piece of identification information in the third identification information list acquired from the intelligent terminal, the entity equipment controls each entity component on the entity equipment to execute a corresponding operation, thus realizing control on the entity components on the entity equipment with the use of the parameters.

Figure 5:
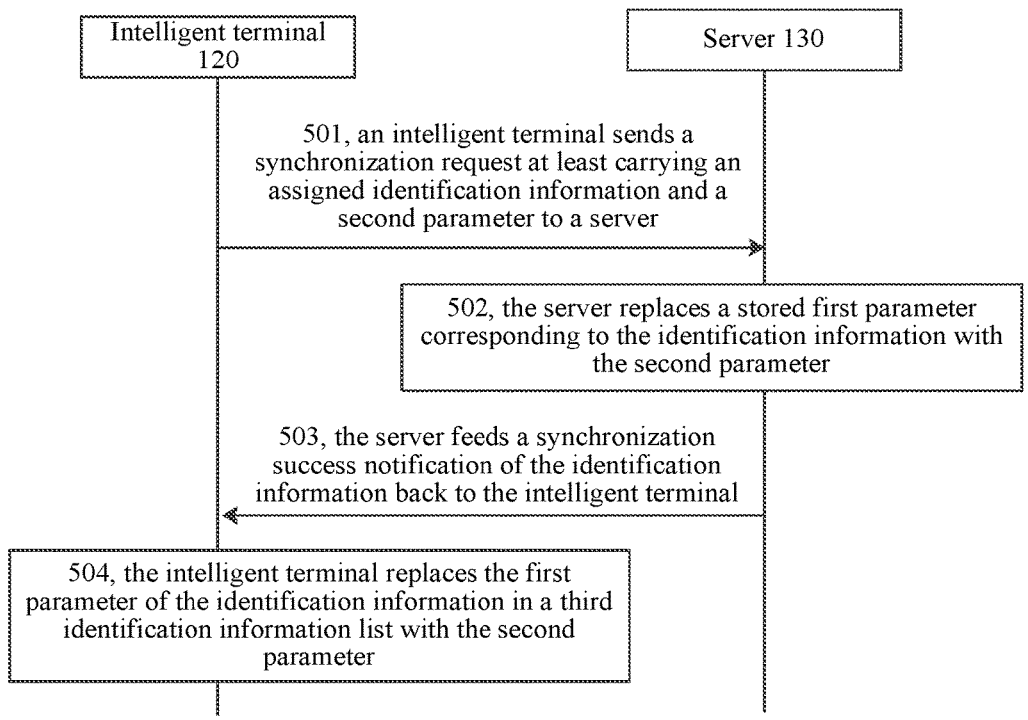
FIG. 5 is a flow diagram of a synchronization method for identification information according to an embodiment of the present disclosure.

In a possible implementation manner, when receiving a setting instruction of setting a parameter of an specified identification information on a virtual model into a second parameter, the intelligent terminal may send a synchronization instruction to a server, to inform the server of replacing a stored first parameter corresponding to the identification information with the second parameter, thus ensuring that the parameters of the specified identification information in the server and the intelligent terminal are consistent. FIG. 5 is a flow diagram of a synchronization method for identification information according to an embodiment of the present disclosure. As shown in FIG. 5, the synchronization method is applied to the implementation environment of FIG. 1. When the intelligent terminal receives a setting instruction of setting a parameter of an specified identification information on a virtual model into a second parameter, the following steps may be executed.

Step 501, the intelligent terminal sends a synchronization request at least carrying the specified identification information and the second parameter to a server.

Correspondingly, the server receives the synchronization request sent by the intelligent terminal and at least carrying the identification information and the second parameter.

Step 502, the server replaces a stored first parameter corresponding to the identification information with the second parameter.

Step 503, the server feeds a synchronization success notification of the identification information back to the intelligent terminal.

Correspondingly, the intelligent terminal receives the synchronization success notification fed back by the server.

Step 504, the intelligent terminal replaces the first parameter of the identification information in a third identification information list with the second parameter.

Step 504 may be executed before step 501.

In some embodiments, when the parameter of the specified identification information is changed on the intelligent terminal, a synchronization instruction is sent to the server to inform the server of updating the parameter of the specified identification information, thereby effectively ensuring that the parameters of the specified identification information in the server and the intelligent terminal are consistent. Further, when a functional component is detached, information about the parameter is not lost. When the functional component is reattached, when the server receives identification information corresponding to the functional component in the first identification information list, the server may add the updated parameter corresponding to the functional component to the second identification information list, such parameter of the functional component is synchronized based on latest upgrade/setting instruction.

The following describes device embodiments of the present disclosure. For details not elaborated in the device embodiments, refer to the foregoing one-to-one corresponding method embodiments.

Figure 6A:
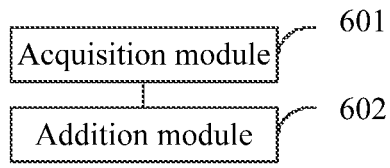
FIG. 6A is a structure block diagram of a virtual model display device according to an embodiment of the present disclosure.

FIG. 6A is a structure block diagram of a virtual model display device provided according to an embodiment of the present disclosure. The virtual model display device is applied to the entity equipment 110 of FIG. 1. As shown in FIG. 6A, the virtual model display device includes an acquisition module 601 and an addition module 602.

The acquisition module 601 is configured to acquire respective identification information of an inherent component and functional components.

The addition module 602 is configured to add each piece of identification information to a first identification information list, and send the first identification information list to an intelligent terminal, wherein the first identification information list is used for triggering the intelligent terminal to send the first identification information list to a server, the server determines a second identification information list according to the first identification information list, the identification information in the second identification information list satisfies a predetermined condition, the predetermined condition includes at least one of the facts that entity components corresponding to the identification information in the second identification information list are valid and the entity component corresponding to each piece of identification information in the second identification information list conforms to an assembly rule, and the intelligent terminal acquires virtual images corresponding to all the identification information in the second identification information list according to the second identification information list, and assembles the virtual images to obtain a virtual model corresponding to the entity equipment.

Figure 6B:
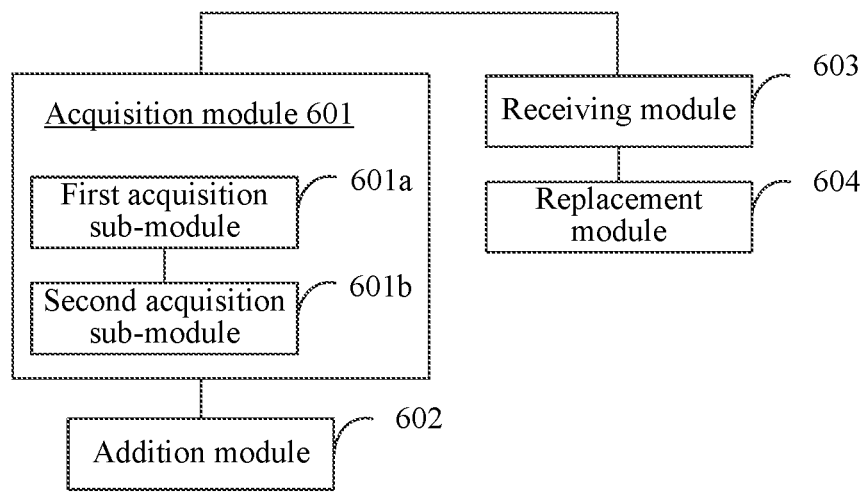
FIG. 6B is a structure block diagram of a virtual model display device according to another embodiment of the present disclosure.

In a possible implementation manner, referring to FIG. 6B, which is a structure block diagram of a virtual model display device provided according to another embodiment of the present disclosure, chips in functional components are connected with a main chip in an inherent component via a bus. An acquisition module 601 includes a first acquisition sub-module 601a and a second acquisition sub-module 601b.

The first acquisition sub-module 601a is configured to acquire identification information, stored in the main chip, of the inherent component.

The second acquisition sub-module 601b is configured to poll chips of all the functional components connected to the bus by using the main chip, to acquire identification information, stored in the chip of each functional component, of the functional component.

In a possible implementation manner, still referring to FIG. 6B, the device further includes a receiving module 603 and a replacement module 604.

The receiving module 603 is configured to receive a third identification information list sent by an intelligent terminal, wherein the third identification information list includes identification information and parameters corresponding to the identification information, and each parameter includes at least one of a first parameter inquired by a server and corresponding to the identification information and a second parameter after the intelligent terminal replaces the first parameter;

The replacement module 604 is configured to replace each original corresponding parameter in the main chip with the parameter of each piece of identification information in the third identification information list, and control each entity component on entity equipment by using the replaced parameter to execute a corresponding operation.

To sum up, according to the virtual model display device according to the embodiment of the present disclosure, the respective identification information of the inherent component and the functional components is sent to the intelligent terminal, and the intelligent terminal forwards the identification information to the server, and assembles the virtual images corresponding to all the identification information when receiving the identification information fed back by the server and satisfying the predetermined condition. After the server feeds the identification information satisfying the predetermined condition back to the intelligent terminal, the intelligent terminal only assembles the virtual images corresponding to the identification information satisfying the predetermined condition, thereby solving the problem in relevant technologies that some functional components need to cooperate with the inherent component to realize corresponding functions, but a user's free assembly may result in that partial functional components are assembled to the mismatched inherent component, so that these functional components cannot realize the corresponding functions, or these functional components are damaged, and achieving the effects of only combining the virtual images corresponding to the identification information satisfying the predetermined condition and reminding the user of timely replacing the functional components corresponding to the identification information not satisfying the predetermined condition.

In some embodiments, according to the parameter of each piece of identification information in the third identification information list acquired from the intelligent terminal, the entity equipment controls each entity component on the entity equipment to execute a corresponding operation, thus realizing control on the entity components on the entity equipment with the use of the parameters.

Figure 7A:
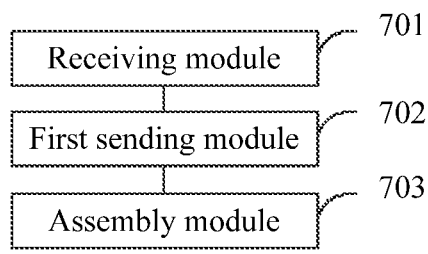
FIG. 7A is a structure block diagram of a virtual model display device according to an embodiment of the present disclosure.

FIG. 7A is a structure block diagram of a virtual model display device according to an embodiment of the present disclosure. The virtual model display device is applied to the intelligent terminal 120 of FIG. 1. As shown in FIG. 7A, the virtual model display device includes a receiving module 701, a first sending module 702 and an assembly module 703.

The receiving module 701 is configured to receive a first identification information list sent by entity equipment, wherein the first identification information list includes at least one piece of identification information, the identification information in the first identification information list is identification information, acquired by the entity equipment, of an inherent component on the entity equipment and functional components installed on the inherent component, and the functional components are detachable components.

The first sending module 702 is configured to send the first identification information list to a server, wherein the first identification information list is used for triggering the server to determine a second identification information list according to the first identification information list, the identification information in the second identification information list satisfies a predetermined condition, and the predetermined condition includes at least one of the facts that entity components corresponding to the identification information in the second identification information list are valid and the entity component corresponding to each piece of identification information in the second identification information list conforms to an assembly rule.

The assembly module 703 is configured to receive the second identification information list fed back by the server, acquire virtual images corresponding to all the identification information in the second identification information list according to the second identification information list, and assemble the virtual images to obtain a virtual model corresponding to the entity equipment.

Figure 7B:
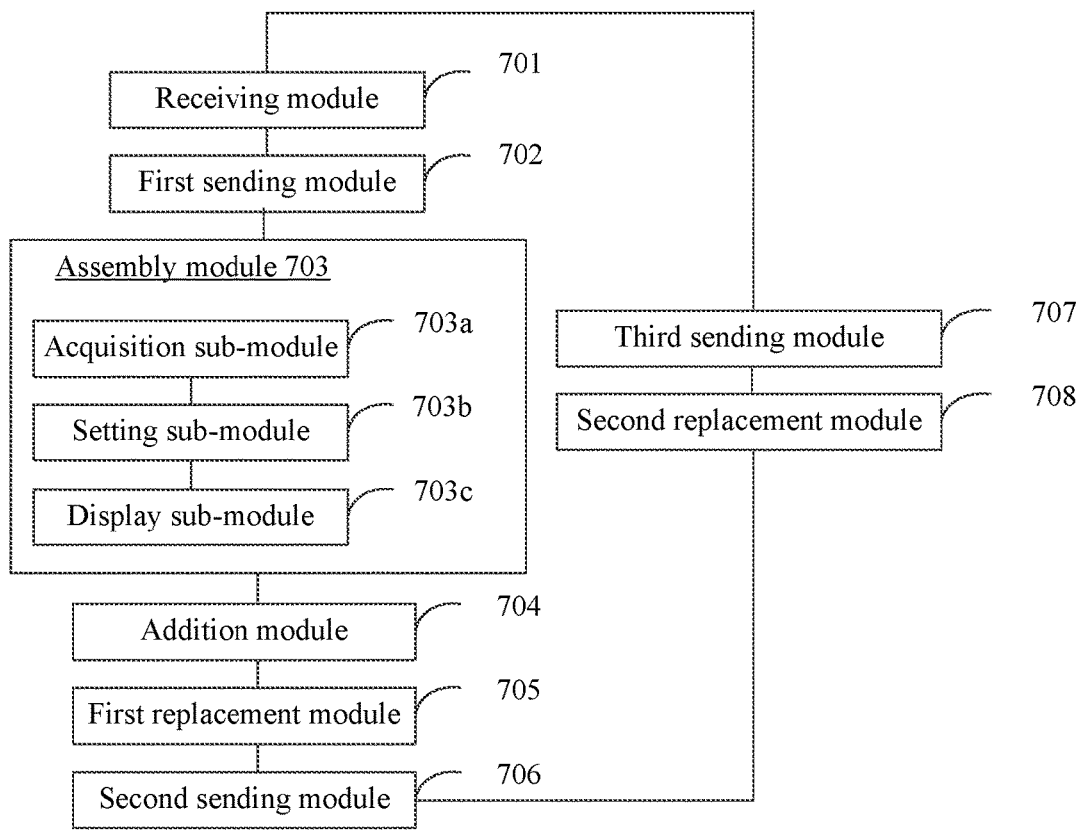
FIG. 7B is a structure block diagram of a virtual model display device according to another embodiment of the present disclosure.

In a possible implementation manner, refer to FIG. 7B, which is a structure block diagram of a virtual model display device according to another embodiment of the present disclosure. A second identification information list further includes a type of each piece of identification information. An assembly module 703 includes an acquisition sub-module 703a, a setting sub-module 703b and a display sub-module 703c.

The acquisition sub-module 703a is configured to acquire an assembly position corresponding to each type;

The setting sub-module 703b is configured to, for each piece of identification information in the second identification information list, set a virtual image corresponding to the identification information to a corresponding position of a virtual model corresponding to entity equipment according to the assembly position corresponding to the identification information;

The display sub-module 703c is configured to, when the virtual images corresponding to all the identification information in the second identification information list are set on the virtual model, display the virtual model, obtained after assembling, on a display screen.

In a possible implementation manner, still referring to FIG. 7B, the second identification list further includes a first parameter corresponding to each piece of identification information, and the device further includes an addition module 704, a first replacement module 705 and a second sending module 706.

The addition module 704 is configured to, after receiving a second identification information list fed back by a server, add a content in the second identification information list to a third identification information list;

The first replacement module 705 is configured to, when receiving a setting instruction of setting a parameter of specified identification information on the virtual model into a second parameter, replace a first parameter of the identification information in the third identification information list with the second parameter;

The second sending module 706 is configured to send the third identification information list to the entity equipment, wherein the third identification information list is used for triggering to replace each original corresponding parameter in a main chip with a parameter of each piece of identification information in the third identification information list, and to control each entity component on the entity equipment by using the replaced parameters to execute a corresponding operation.

In a possible implementation manner, still referring to FIG. 7B, the device further includes a third sending module 707 and a second replacement module 708.

The third sending module 707 is configured to, when receiving a setting instruction of setting a parameter of specified identification information on a virtual model into a second parameter, send a synchronization request at least carrying the specified identification information and the second parameter to a server, wherein the synchronization request is used for triggering the server to replace the stored parameter of the specified identification information with the second parameter, and to feed a synchronization success notification of the specified identification information back to an intelligent terminal;

The second replacement module 708 is configured to receive a synchronization success notification fed back by the server, and replace a first parameter of the identification information in the third identification information list with the second parameter.

To sum up, according to the virtual model display device according to the embodiments of the present disclosure, the respective identification information of the inherent component and the functional components is sent to the intelligent terminal, and the intelligent terminal forwards the identification information to the server, and assembles the virtual images corresponding to all the identification information when receiving the identification information fed back by the server and satisfying the predetermined condition. After the server feeds the identification information satisfying the predetermined condition back to the intelligent terminal, the intelligent terminal only assembles the virtual images corresponding to the identification information satisfying the predetermined condition, thereby solving the problem in relevant technologies that some functional components need to cooperate with the inherent component to realize corresponding functions, but a user's free assembly may result in that partial functional components are assembled to the mismatched inherent component, so that these functional components cannot realize the corresponding functions, or these functional components are damaged, and achieving the effects of only assembling the virtual images corresponding to the identification information satisfying the predetermined condition and reminding the user of timely replacing the functional components corresponding to the identification information not satisfying the predetermined condition.

In one embodiment, the virtual images corresponding to the identification information are set at the corresponding positions of the virtual model corresponding to the entity equipment according to the assembly positions corresponding to the types of the identification information, to achieve the effect of precisely assembling the virtual images corresponding to the identification information after acquiring the types of the identification information.

In one embodiment, the parameters of the identification information are updated in time, and the updated parameters of the identification information are sent to the entity equipment, thus avoiding the situation that the entity components on the entity equipment are controlled mistakenly due to overdue parameters.

In one embodiment, when the parameter of the specified identification information is changed on the intelligent terminal, a synchronization instruction is sent to the server to inform the server of updating the parameter of the specified identification information, thereby effectively ensuring that the parameters of the specified identification information in the server and the intelligent terminal are consistent.

Figure 8A:
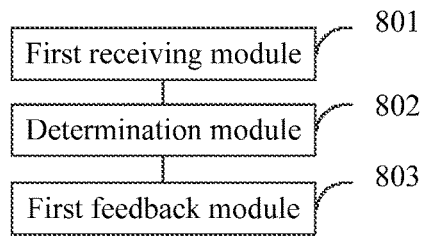
FIG. 8A is a structure block diagram of a virtual model display device according to an embodiment of the present disclosure.

FIG. 8A is a structure block diagram of a virtual model display device according to an embodiment of the present disclosure. The virtual model display device is applied to the server 130 of FIG. 1. As shown in FIG. 8A, the virtual model display device includes a first receiving module 801, a determination module 802 and a first feedback module 803.

The first receiving module 801 is configured to receive a first identification information list generated by entity equipment and forwarded by an intelligent terminal, wherein the first identification information list includes at least one piece of identification information, the identification information in the first identification information list is identification information, acquired by the entity equipment, of an inherent component on the entity equipment and functional components installed on the inherent component, and the functional components are detachable components;

The determination module 802 is configured to determine a second identification information list according to the first identification information list, wherein the identification information in the second identification information list satisfies a predetermined condition, and the predetermined condition includes at least one of the facts that entity components corresponding to the identification information in the second identification information list are valid and the entity component corresponding to each piece of identification information in the second identification information list conforms to an assembly rule;

The first feedback module 803 is configured to feed the second identification information list back to the intelligent terminal, wherein the second identification information list is used for triggering the intelligent terminal to acquire virtual images corresponding to all the identification information in the second identification information list according to the second identification information list, and to assemble the virtual images to obtain a virtual model corresponding to the entity equipment.

Figure 8B:
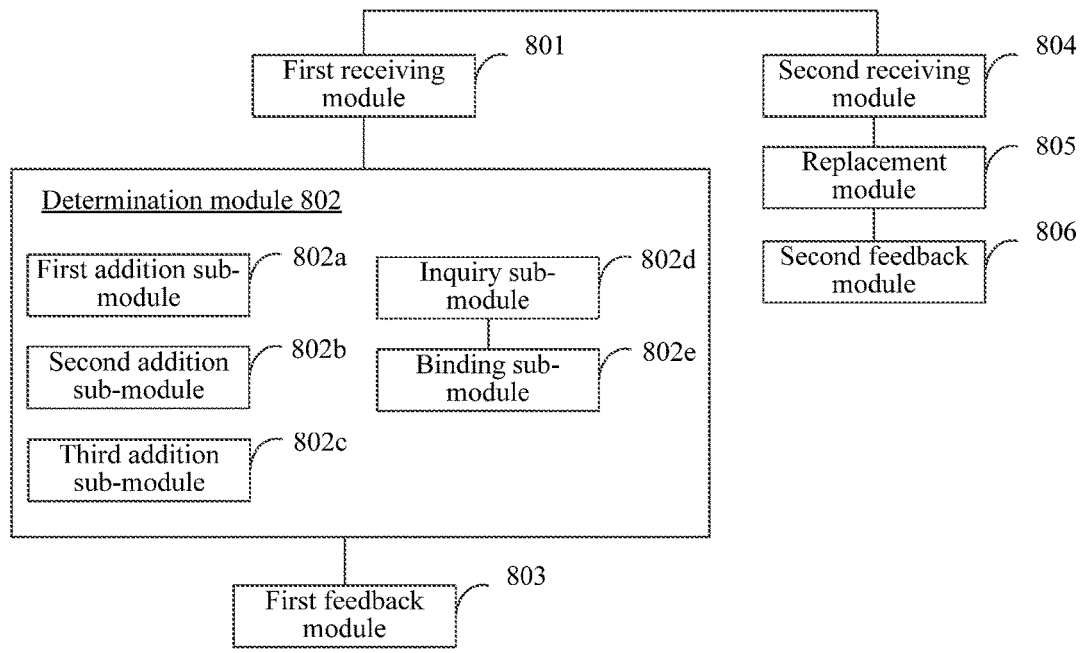
FIG. 8B is a structure block diagram of a virtual model display device according to another embodiment of the present disclosure.

In a possible implementation manner, refer to FIG. 8B, which is a structure block diagram of a virtual model display device according to another embodiment of the present disclosure. A determination module 802 includes a first addition sub-module 802a, a second addition sub-module 802b and a third addition sub-module 802c.

The first addition sub-module 802a is configured to add valid identification information of corresponding entity components in a first identification information list into a second identification information list; or, The second addition sub-module 802b is configured to add identification information, conforming to an assembly rule, of the corresponding entity components in the first identification information list into the second identification information list; or, The third addition sub-module 802c is configured to add the identification information, which is valid and conforms to the assembly rule, of the corresponding entity components in the first identification information list into the second identification information list.

In a possible implementation manner, still referring to FIG. 8B, the determination module 802 further includes an inquiry sub-module 802d and a binding sub-module 802e.

The inquiry sub-module 802d is configured to, for each piece of identification information in the second identification information list, inquire a stored first parameter corresponding to the identification information;

The binding sub-module 802e is configured to add the first parameters into the second identification information list, and bind the first parameters with the corresponding identification information.

In a possible implementation manner, still referring to FIG. 8B, the device further includes a second receiving module 804, a replacement module 805 and a second feedback module 806.

The second receiving module 804 is configured to receive a synchronization request sent by an intelligent terminal and at least carrying identification information and a second parameter;

The replacement module 805 is configured to replace a stored first parameter corresponding to the identification information with the second parameter;

The second feedback module 806 is configured to feed a synchronization success notification of the identification information back to the intelligent terminal.

To sum up, according to the virtual model display device according to the embodiments of the present disclosure, the respective identification information of the inherent component and the functional components is sent to the intelligent terminal, and the intelligent terminal forwards the identification information to the server, and assembles the virtual images corresponding to all the identification information when receiving the identification information fed back by the server and satisfying the predetermined condition. After the server feeds the identification information satisfying the predetermined condition back to the intelligent terminal, the intelligent terminal only assembles the virtual images corresponding to the identification information satisfying the predetermined condition, thereby solving the problem in relevant technologies that some functional components need to cooperate with the inherent component to realize corresponding functions, but a user's free assembly may result in that partial functional components are assembled to the mismatched inherent component, so that these functional components cannot realize the corresponding functions, or these functional components are damaged, and achieving the effects of only assembling the virtual images corresponding to the identification information satisfying the predetermined condition and reminding the user of timely replacing the functional components corresponding to the identification information not satisfying the predetermined condition.

In one embodiment, because the predetermined condition may include at least one of the facts that the entity components corresponding to the identification information are valid and the entity components corresponding to the identification information conforms to an assembly rule, all the identification information in the second identification information list can be effectively ensured to satisfy the predetermined condition by adding the identification information satisfying the predetermined condition into the second identification information list.

In one embodiment, the first parameter corresponding to the identification information is bound with an identification and is stored into the second identification information list, and after the intelligent terminal forwards the second identification information list, fed back by the server, to the entity equipment, the entity equipment may control the entity components on the entity equipment according to the parameter in the second identification information.

The parameters of the specified identification information in the server and the intelligent terminal are effectively ensured to be consistent by receiving a synchronization instruction sent by the intelligent terminal for the parameter of the specified identification information, and by updating the parameter of the specified identification information.

Figure 9:
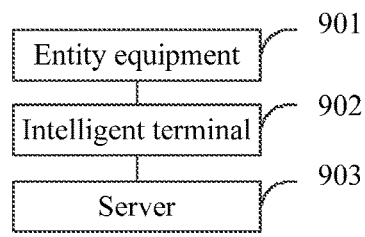
FIG. 9 is a block diagram of a virtual model display system according to an embodiment of the present disclosure.

FIG. 9 is a block diagram of a virtual model display system according to an embodiment of the present disclosure. The virtual model display system is applied to the implementation environment of FIG. 1, as shown in FIG. 9. The virtual model display system may include entity equipment 901, an intelligent terminal 902 and a server 903.

The entity equipment 901 includes a virtual model display device as described in FIG. 6A and FIG. 6B. The virtual model display device is specifically described in FIG. 6A and FIG. 6B, and is not further described herein.

The intelligent terminal 902 may include a virtual model display device as described in FIG. 7A and FIG. 7B. The virtual model display device is specifically described in FIG. 7A and FIG. 7B, and is not further described herein.

The server 903 may include a virtual model display device as described in FIG. 8A and FIG. 8B. The virtual model display device is specifically described in FIG. 8A and FIG. 8B, and is not further described herein.

To sum up, according to the virtual model display device according to the embodiments of the present disclosure, the respective identification information of the inherent component and the functional components is sent to the intelligent terminal, and the intelligent terminal sends the identification information to the server, and assembles the virtual images corresponding to all the identification information when receiving the identification information fed back by the server and satisfying the predetermined condition. After the server feeds the identification information satisfying the predetermined condition back to the intelligent terminal, the intelligent terminal only assembles the virtual images corresponding to the identification information satisfying the predetermined condition, thereby solving the problem in relevant technologies that some functional components need to cooperate with the inherent component to realize corresponding functions, but a user's free assembly may result in that partial functional components are assembled to the mismatched inherent component, so that these functional components cannot realize the corresponding functions, or these functional components are damaged, and achieving the effects of only assembling the virtual images corresponding to the identification information satisfying the predetermined condition and reminding the user of timely replacing the functional components corresponding to the identification information not satisfying the predetermined condition.

It should be noted that division of above functional modules is only described for exemplary purposes when the virtual model display device according to the foregoing embodiments displays the virtual model. In actual application, above functions may be allocated to different functional modules according to needs, which means that the internal structure of the server is divided to different functional modules to complete all or some of the above described functions. In addition, the virtual model display device according to the foregoing embodiments is based on the same concept as the embodiments of the virtual model display method For the specific implementation process, refer to the method embodiments, and details are not described herein again.

Figure 10:
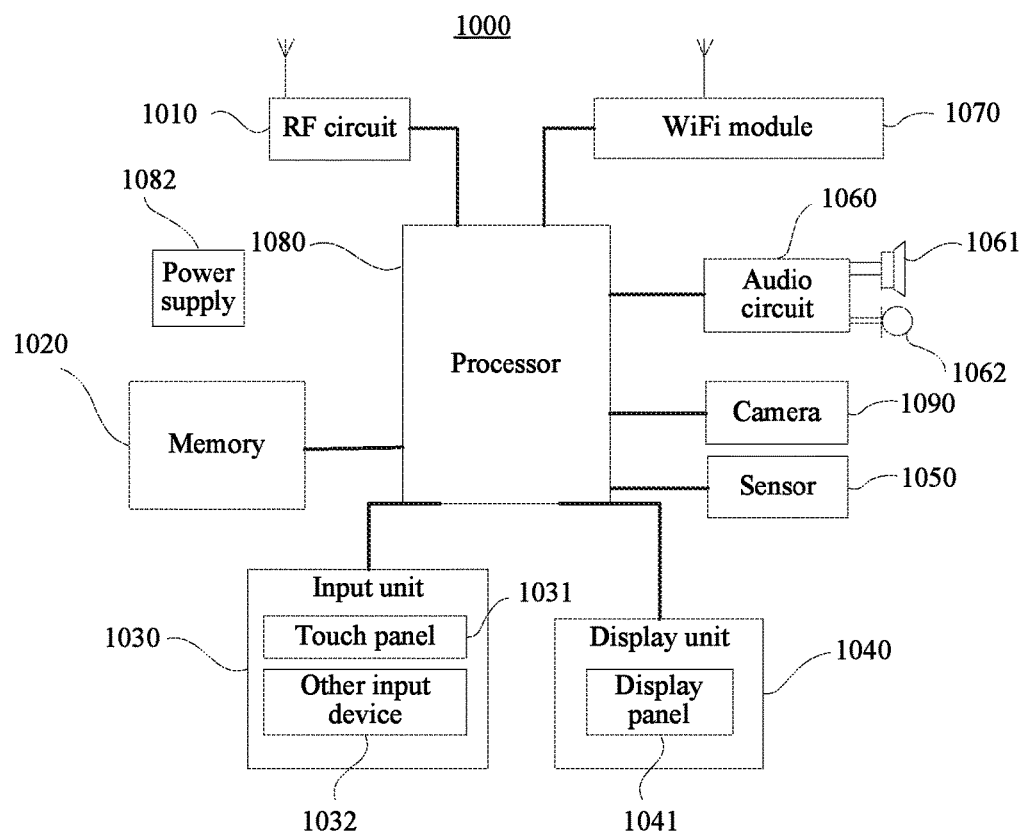
FIG. 10 is a structure block diagram of an intelligent terminal according to partial embodiments of the present disclosure.

Refer to FIG. 10, which is a structure block diagram of an intelligent terminal provided according to partial embodiments of the present disclosure. The intelligent terminal 1000 is configured to implement the virtual model display methods provided by the foregoing embodiments. The intelligent terminal 1000 in the present disclosure may include one or more of the following components: a processor configured to execute a computer program instruction to complete various processes and methods, a random access memory (RAM) and a read only memory (ROM) configured to store information and program instructions, a memory configured to store data and information, an I/O device, an interface, an antenna, and the like. Specifically:

The intelligent terminal 1000 may include components such as a radio frequency (RF) circuit 1010, a memory 1020, an input unit 1030, a display unit 1070, a sensor 1050, an audio circuit 1060, a wireless fidelity (WiFi) module 1070, a processor 1080, a power supply 1082, and a camera 1090. A person skilled in the art may understand that the structure of the intelligent terminal shown in FIG. 10 does not constitute a limitation to the intelligent terminal, and the intelligent terminal may include more components or fewer components than those shown in the figure, or some components may be combined, or a different component arrangements may be used.

The following specifically introduces the components of the intelligent terminal 1000 with reference to FIG. 10.

The RF circuit 1010 may be configured to receive and send signals during an information receiving and sending process or a call process. Particularly, the RF circuit 1010 receives downlink information of a base station, then delivers the downlink information to the processor 1080 for processing, and sends related uplink data to the base station. Generally, the RF circuit includes, but is not limited to, an antenna, at least one amplifier, a transceiver, a coupler, a low noise amplifier (LNA), a duplexer and the like. In addition, the RF circuit 1010 may also communicate with a network and another device by wireless communication. The wireless communication may use any communications standard or protocol, which includes, but is not limited to, Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 1020 may be configured to store a software program and module. The processor 1080 runs the software program and module stored in the memory 1020, to implement various functional applications and data processing of the intelligent terminal 1000. The memory 1020 may mainly include a program storage area and a data storage area, wherein the program storage area may store an operating system, an application program required by at least one function (such as a sound play function and an image play function), and the like. The data storage area may store data (such as audio data and an address book) created according to use of the intelligent terminal 1000, and the like. In addition, the memory 1020 may include a high speed random access memory, and may also include a non-volatile memory such as at least one magnetic disk storage device, a flash memory, or another volatile solid-state storage device.

The input unit 1030 may be configured to receive input digit or character information, and generate a key signal input related to user setting and function control of the intelligent terminal 1000. Specifically, the input unit 1030 may include a touch panel 1031 and another input device 1032. The touch panel 1031, which is also be referred to as a touch screen, may collect a touch operation of a user on or near the touch panel (such as an operation of the user on the touch panel 1031 or near the touch panel 1031 by using any suitable object or accessory such as a finger or a stylus), and drive a corresponding connection apparatus according to a preset program. The touch panel 1031 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 1080. Moreover, the touch controller can receive and execute a command sent by the processor 1080. In addition, the touch panel 1031 may be implemented by a resistive, capacitive, infrared, or surface sound wave type touch panel. In addition to the touch panel 1031, the input unit 1030 may further include the other input device 1032. Specifically, the other input device 1032 may include, but is not limited to, one or more of a physical keyboard, a functional key (such as a volume control key or a switch key), a track ball, a mouse, and a joystick.

The display unit 1070 may be configured to display information input by the user or information provided for the user, and various menus of the intelligent terminal 1000. The display unit 1070 may include a display panel 4101. The display panel 4101 may be configured by using a liquid crystal display (LCD), an organic light-emitting diode (OLED), or the like. Further, the touch panel 1031 may cover the display panel 4101. After detecting a touch operation on or near the touch panel 1031, the touch panel 1031 transfers the touch operation to the processor 1080, so as to determine the type of a touch event. Then, the processor 1080 provides a corresponding visual output on the display panel 4101 according to the type of the touch event. Although in FIG. 10, the touch panel 1031 and the display panel 4101 are used as two separate parts to implement input and output functions of the intelligent terminal 1000, in some embodiments, the touch panel 1031 and the display panel 4101 may be integrated to implement the input and output functions of the intelligent terminal 1000.

The intelligent terminal 1000 may further include at least one sensor 1050 such as a gyro sensor, a magnetic induction sensor, an optical sensor, a motion sensor, and other sensors. Specifically, the optical sensor may include an ambient light sensor and a proximity sensor, wherein the ambient light sensor can adjust luminance of the display panel 4101 according to brightness of ambient light, and the proximity sensor may switch off the display panel 4101 and/or backlight when the intelligent terminal 1000 is moved to the ear. As one type of motion sensor, an acceleration sensor may detect magnitude of accelerations in various directions (generally on three axes), may detect magnitude and a direction of the gravity when static, and may be applied to an application that recognizes the attitude of an intelligent terminal (for example, screen switching between landscape orientation and portrait orientation, a related game, and magnetometer attitude calibration), a function related to vibration recognition (such as a pedometer and a knock), and the like. Other sensors such as a barometer, a hygrometer, a thermometer, and an infrared sensor, which may further be configured for the intelligent terminal 1000, are not further described herein.

The audio circuit 1060, a loudspeaker 1061, and a microphone 1062 may provide audio interfaces between the user and the intelligent terminal 1000. The audio circuit 1060 may convert received audio data into an electric signal and transmit the electric signal to the loudspeaker 1061. The loudspeaker 1061 converts the electric signal into a sound signal for output. On the other hand, the microphone 1062 converts a collected sound signal into an electric signal. The audio circuit 1060 receives the electric signal and converts the electric signal into audio data, and outputs the audio data to the processor 1080 for processing. Then, the processor 1080 sends the audio data to, for example, another intelligent terminal by the RF circuit 1010, or outputs the audio data to the memory 1020 for further processing.

WiFi is a short distance wireless transmission technology. The intelligent terminal 1000 may help, by the WiFi module 1070, the user to receive and send e-mails, browse a webpage, access streaming media, and so on, which provides wireless broadband Internet access for the user. Although FIG. 10 shows the WiFi module 1070, it may be understood that the WiFi module is not a necessary component of the intelligent terminal 1000, and when required, the WiFi module may be absolutely omitted as long as the scope of the essence of the present disclosure is not changed.

The processor 1080 is a control center of the intelligent terminal 1000, and is connected to various parts of the whole intelligent terminal by using various interfaces and lines. By running or executing the software program and/or module stored in the memory 1020, and invoking data stored in the memory 1020, the processor 1080 performs various functions of the intelligent terminal 1000 and processes data, thereby performing overall monitoring on the intelligent terminal. The processor 1080 may include one or more processing units. Preferably, the processor 1080 may integrate an application processor and a modem, wherein the application processor mainly processes an operating system, a user interface, an application program, and the like, and the modem mainly processes wireless communication. It may be understood that the foregoing modem may also not be integrated into the processor 1080.

The intelligent terminal 1000 further includes the power supply 1082 (such as a battery) for supplying power to the components. Preferably, the power supply may be logically connected to the processor 1082 by using a power management system, thereby implementing functions such as charging, discharging and power consumption management by the power management system.

The camera 1090 is generally composed of a lens, an image sensor, an interface, a digital signal processor, a central processing unit (CPU), a display screen, and the like, wherein the lens is fixed above the image sensor, and the lens may be manually adjusted to change a focus; the image sensor is equivalent to a "film" of a conventional camera, and is a heart of the camera for collecting an image; the interface is configured to connect the camera to a main board of the intelligent terminal by using a flat cable, a board-to-board connector or a spring-type connection mode, and to send a collected image to the memory 1020; and the digital signal processor processes the collected image via mathematical operation, converts a collected analog image into a digital image and sends the digital image to the memory 1020 via the interface.

Although not shown in the figures, the intelligent terminal 1000 may further include a camera, a Bluetooth module, and the like, which are not further described herein. Specifically, in one embodiment, the display unit of the intelligent terminal 1000 is a touch screen display, and the intelligent terminal 1000 further includes a memory and one or more than one program. The one or more than one program is stored in the memory, and the one or more programs, including the method described in FIG. 2A, FIG. 3A, FIG. 4A or FIG. 5 or the functions of the devices described by FIG. 6A to FIG. 9, are configured to be executed by one or more than one processor.

The embodiments of the present disclosure provide a virtual model display method, device and system in order to solve the problem in relevant technologies that some functional components need to cooperate with an inherent component to realize corresponding functions, but a user's free assembly may result in that partial functional components are assembled to the mismatched inherent component, so that these functional components cannot realize the corresponding functions, or these functional components are damaged.

The respective identification information of the inherent component and the functional components is sent to the intelligent terminal, and the intelligent terminal forwards the identification information to the server, and assembles the virtual images corresponding to all the identification information when receiving the identification information fed back by the server and satisfying the predetermined condition. After the server feeds the identification information satisfying the predetermined condition back to the intelligent terminal, the intelligent terminal only assembles the virtual images corresponding to all the identification information satisfying the predetermined condition, thereby solving the problem in relevant technologies that some functional components need to cooperate with the inherent component to realize corresponding functions, but a user's free assembly may result in that partial functional components are assembled to the mismatched inherent component, so that these functional components cannot realize the corresponding functions, or these functional components are damaged, and achieving the effects of only assembling the virtual images corresponding to all the identification information satisfying the predetermined condition and reminding the user of timely replacing the functional components corresponding to the identification information not satisfying the predetermined condition.

The sequence numbers of the foregoing embodiments of the present disclosure are merely for the convenience of description, and do not imply the preference among the embodiments.

A person of ordinary skill in the art may understand that all or some of the steps of the foregoing embodiments may be implemented by hardware, or may be implemented by a program instructing relevant hardware. The program may be stored in a computer readable storage medium. The storage medium may be a read-only memory, a magnetic disk, an optical disc, or the like.

Therefore, the present disclosure further provides a storage medium, wherein a data processing program is stored, the data processing program being used for performing any one of the embodiments of the method in the present disclosure.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A virtual model display method, applied to an intelligent terminal, and the method comprising:
    receiving, by the intelligent terminal, a first identification information list sent by an entity equipment, wherein the first identification information list comprises first identification information of components of the entity equipment acquired by the entity equipment, the first identification information including at least an identification information of an inherent component of the entity equipment and an identification information of a functional component of the entity equipment, and the functional component is a detachable component installed on the inherent component of the entity equipment;
    sending, by the intelligent terminal, the first identification information list to a server, the first identification information list being used for triggering the server to determine a second identification information list according to the first identification information list;
    receiving, by the intelligent terminal, the second identification information list fed back by the server, wherein the second identification information list comprises identification information that is included in the first identification information list and verified by the server;
    acquiring, by the intelligent terminal, one or more virtual images corresponding to the identification information in the second identification information list; and
    assembling the one or more virtual images to obtain a virtual model corresponding to the entity equipment.

2. The method according to claim 1, wherein the identification information in the second identification information list is verified by the server as satisfying a predetermined condition; and the predetermined condition comprising at least one of: a component corresponding to an identification information in the second identification information list is valid, and components corresponding to each piece of identification information in the second identification information list conform to an assembly rule.

3. The method according to claim 2, further comprising:
    when a piece of identification information in the first identification information list does not conform to the assembly rule, displaying, by the intelligent terminal, a reminder that a functional component corresponding to the piece of identification information is mismatched with the inherent component.

4. The method according to claim 1, wherein the second identification information list further comprises types of each piece of the identification information in the second identification information list, and assembling the one or more virtual images to obtain the virtual model corresponding to the entity equipment comprises:
for each piece of the identification information in the second identification information list,
acquiring an assembly position corresponding to a type of the piece of the identification information in the second identification information list; and
setting a virtual image corresponding to the piece of the identification information to a corresponding position of the virtual model corresponding to the entity equipment according to the assembly position corresponding to the type of the piece of the identification information in the second identification information list; and
displaying the virtual model on a display screen when the one or more virtual images corresponding to all pieces of the identification information in the second identification information list are set on corresponding assembly locations on the virtual model.

5. The method according to claim 1, wherein the second identification information list further comprises first parameters corresponding to each piece of the identification information in the second identification information list, and the method further comprises:
adding a content of the second identification information list into a third identification information list after receiving the second identification information list fed back by the server;
receiving a setting instruction of setting a parameter of a specified identification information on the virtual model into a second parameter;
in response to the setting instruction, replacing a first parameter of the specified identification information in the third identification information list with the second parameter; and
sending the third identification information list to the entity equipment, the third identification information list being used for triggering to replace a parameter of a component corresponding to the specified identification information stored in a main chip of the entity equipment with the second parameter in the third identification information list, and to control the component corresponding to the specified identification information on the entity equipment by using the replaced parameter to execute a corresponding operation.

6. The method according to claim 5, wherein the method further comprises:
sending a synchronization request at least carrying the specified identification information and the second parameter to the server when receiving the setting instruction of setting the parameter of the specified identification information on the virtual model into the second parameter, the synchronization request being used for triggering the server to replace the stored parameter of the specified identification information with the second parameter, and to feed a synchronization success notification of the specified identification information back to the intelligent terminal; and
receiving the synchronization success notification fed back by the server, and executing the step of replacing the first parameter of the specified identification information in the third identification information list with the second parameter.

7. The method according to claim 5, wherein a first parameter corresponding to a piece of the identification information in the second identification information list includes at least one of a description information or a control information of a component of the entity equipment corresponding to the piece of the identification information in the second identification information list.

8. A virtual model display device, applied to an intelligent terminal, and the device comprising:
a memory; and
a processor coupled to the memory and configured to perform:
receiving a first identification information list sent by an entity equipment, wherein the first identification information list comprises first identification information of components of the entity equipment acquired by the entity equipment, the first identification information including at least an identification information of an inherent component of the entity equipment and an identification information of a functional component of the entity equipment, and the functional component is a detachable component installed on the inherent component of the entity equipment;
sending the first identification information list to a server, the first identification information list being used for triggering the server to determine a second identification information list according to the first identification information list;
receiving the second identification information list fed back by the server, wherein the second identification information list comprises identification information that is included in the first identification information list and verified by the server;
acquiring one or more virtual images corresponding to the identification information in the second identification information list; and
assembling the one or more virtual images to obtain a virtual model corresponding to the entity equipment.

9. The device according to claim 8, wherein the identification information in the second identification information list is verified by the server as satisfying a predetermined condition; and the predetermined condition comprising at least one of: a component corresponding to an identification information in the second identification information list is valid, and components corresponding to each piece of identification information in the second identification information list conform to an assembly rule.

10. The device according to claim 9, wherein the processor is further configured to perform:
when a piece of identification information in the first identification information list does not conform to the assembly rule, displaying a reminder that a functional component corresponding to the piece of identification information is mismatched with the inherent component.

11. The device according to claim 8, wherein the second identification information list further comprises types of each piece of the identification information in the second identification information list, and assembling the one or more virtual images to obtain the virtual model corresponding to the entity equipment comprises:
for each piece of the identification information in the second identification information list, acquiring an assembly position corresponding to a type of the piece of the identification information in the second identification information list; and setting a virtual image corresponding to the piece of the identification information to a corresponding position of the virtual model corresponding to the entity equipment according to the assembly position corresponding to the type of the piece of the identification information in the second identification information list; and displaying the virtual model on a display screen when the one or more virtual images corresponding to all pieces of the identification information in the second identification information list are set on corresponding assembly locations on the virtual model.

12. The device according to claim 8, wherein the second identification information list further comprises first parameters corresponding to each piece of the identification information in the second identification information list, and the processor is further configured to perform:

adding a content of the second identification information list into a third identification information list after receiving the second identification information list fed back by the server;

receiving a setting instruction of setting a parameter of a specified identification information on the virtual model into a second parameter;

in response to the setting instruction, replacing a first parameter of the specified identification information in the third identification information list with the second parameter; and sending the third identification information list to the entity equipment, the third identification information list being used for triggering to replace a parameter of a component corresponding to the specified identification information stored in a main chip of the entity equipment with the second parameter in the third identification information list, and to control the component corresponding to the specified identification information on the entity equipment by using the replaced parameter to execute a corresponding operation.

13. The device according to claim 12, wherein the processor is further configured to perform:

sending a synchronization request at least carrying the specified identification information and the second parameter to the server when receiving the setting instruction of setting the parameter of the specified identification information on the virtual model into the second parameter, the synchronization request being used for triggering the server to replace the stored parameter of the specified identification information with the second parameter, and to feed a synchronization success notification of the specified identification information back to the intelligent terminal; and receiving the synchronization success notification fed back by the server, and executing the step of replacing the first parameter of the specified identification information in the third identification information list with the second parameter.

14. The device according to claim 12, wherein a first parameter corresponding to a piece of the identification information in the second identification information list includes at least one of a description information or a control information of a component of the entity equipment corresponding to the piece of the identification information in the second identification information list.

15. A non-transitory computer-readable medium storing computer-executable program that, when being executed by a processor of an intelligent terminal, causes the processor to perform:

receiving a first identification information list sent by an entity equipment, wherein the first identification information list comprises first identification information of components of the entity equipment acquired by the entity equipment, the first identification information including at least an identification information of an inherent component of the entity equipment and an identification information of a functional component of the entity equipment, and the functional component is a detachable component installed on the inherent component of the entity equipment;

sending the first identification information list to a server, the first identification information list being used for triggering the server to determine a second identification information list according to the first identification information list;

receiving the second identification information list fed back by the server, wherein the second identification information list comprises identification information that is included in the first identification information list and verified by the server;

acquiring one or more virtual images corresponding to the identification information in the second identification information list; and assembling the one or more virtual images to obtain a virtual model corresponding to the entity equipment.

16. The storage medium according to claim 15, wherein the identification information in the second identification information list is verified by the server as satisfying a predetermined condition; and the predetermined condition comprising at least one of: a component corresponding to an identification information in the second identification information list is valid, and components corresponding to each piece of identification information in the second identification information list conform to an assembly rule.

17. The storage medium according to claim 16, wherein the computer-executable program further causes the processor to perform:

when a piece of identification information in the first identification information list does not conform to the assembly rule, displaying a reminder that a functional component corresponding to the piece of identification information is mismatched with the inherent component.

18. The storage medium according to claim 15, wherein the second identification information list further comprises types of each piece of the identification information in the second identification information list, and assembling the one or more virtual images to obtain the virtual model corresponding to the entity equipment comprises:

for each piece of the identification information in the second identification information list, acquiring an assembly position corresponding to a type of the piece of the identification information in the second identification information list; and setting a virtual image corresponding to the piece of the identification information to a corresponding position of the virtual model corresponding to the entity equipment according to the assembly position corresponding to the type of the piece of the identification information in the second identification information list; and displaying the virtual model on a display screen when the one or more virtual images corresponding to all pieces of the identification information in the second identification information list are set on corresponding assembly locations on the virtual model.

19. The storage medium according to claim 15, wherein the second identification information list further comprises first parameters corresponding to each piece of the identification information in the second identification information list, and the computer-executable program further causes the processor to perform:
adding a content of the second identification information list into a third identification information list after receiving the second identification information list fed back by the server;
receiving a setting instruction of setting a parameter of a specified identification information on the virtual model into a second parameter;
in response to the setting instruction, replacing a first parameter of the specified identification information in the third identification information list with the second parameter; and
sending the third identification information list to the entity equipment, the third identification information list being used for triggering to replace a parameter of a component corresponding to the specified identification information stored in a main chip of the entity equipment with the second parameter in the third identification information list, and to control the component corresponding to the specified identification information on the entity equipment by using the replaced parameter to execute a corresponding operation.

20. The storage medium according to claim 19, wherein the computer-executable program further causes the processor to perform:
sending a synchronization request at least carrying the specified identification information and the second parameter to the server when receiving the setting instruction of setting the parameter of the specified identification information on the virtual model into the second parameter, the synchronization request being used for triggering the server to replace the stored parameter of the specified identification information with the second parameter, and to feed a synchronization success notification of the specified identification information back to the intelligent terminal; and
receiving the synchronization success notification fed back by the server, and executing the step of replacing the first parameter of the specified identification information in the third identification information list with the second parameter.

* * * * *